United States Patent
Kimura

(10) Patent No.: US 8,165,004 B2
(45) Date of Patent: Apr. 24, 2012

(54) OPTICAL PICKUP DEVICE

(75) Inventor: Shigeharu Kimura, Yokohama (JP)

(73) Assignee: Hitachi Media Electronics Co., Ltd., Iwate-ken (JP)

( * ) Notice: Subject to any disclaimer, the term of this patent is extended or adjusted under 35 U.S.C. 154(b) by 21 days.

(21) Appl. No.: 12/898,750

(22) Filed: Oct. 6, 2010

(65) Prior Publication Data
US 2011/0128838 A1 Jun. 2, 2011

(30) Foreign Application Priority Data
Nov. 27, 2009 (JP) ................................. 2009-269424

(51) Int. Cl.
*G11B 7/00* (2006.01)
(52) U.S. Cl. ......... 369/112.29; 369/112.01; 369/112.03; 369/112.16
(58) Field of Classification Search ............. 369/112.29, 369/112.01, 112.03, 112.16
See application file for complete search history.

(56) References Cited

U.S. PATENT DOCUMENTS

| | | | |
|---|---|---|---|
| 2007/0104072 A1* | 5/2007 | Ogata | 369/112.16 |
| 2007/0268807 A1* | 11/2007 | Kimura et al. | 369/112.16 |
| 2008/0127238 A1* | 5/2008 | Kimura et al. | 720/659 |
| 2008/0267019 A1* | 10/2008 | Kimura et al. | 369/44.12 |

FOREIGN PATENT DOCUMENTS
JP 2008-135097 6/2008
* cited by examiner

*Primary Examiner* — Latanya Bibbins
(74) *Attorney, Agent, or Firm* — Antonelli, Terry, Stout & Kraus, LLP.

(57) ABSTRACT

An optical pickup device capable of eliminating interlayer crosstalk which is responsible for fluctuation in control signals and error rate in data signals, thereby ensuring stable action for a multilayered recording disc with a narrow interlayer spacing. The reflected beam coming from the multilayered disc is divided along the central line into two parallel portions by the dividing optical system and then condensed. The reflected beam coming from the active layer, which has been condensed, is reflected by the reflecting plane whose reflecting region is limited and the thus reflected beam is detected by the optical detector. The reflected beam coming from other layers is not reflected by the reflecting plane, so that interlayer crosstalk is reduced.

12 Claims, 15 Drawing Sheets

OPTICAL PICKUP DEVICE

CLAIM OF PRIORITY

The present application claims priority from Japanese patent application JP 2009-269424 filed on Nov. 27, 2009, the content of which is hereby incorporated by reference into this application.

FIELD OF THE INVENTION

The present invention relates to an optical pickup device. More particularly, the present invention relates to the reading optical system of the optical pickup device.

BACKGROUND OF THE INVENTION

Recent technical innovation in the field of optical disc is multiplication of recording layers for increase in capacity. Multilayered optical discs, however, suffer interlayer crosstalk during playback on an ordinary optical drive unit.

Crosstalk from a multilayered optical disc results from the detecting optical system in the optical pickup device as explained below with reference to FIG. 3, on the assumption that tracking error signals are detected by DPP (Differential Push-Pull) method. The DPP method consists of dividing a laser beam into one main beam and two sub-beams by means of a diffraction grating and allowing the three beams to irradiate an optical disc. Only the main beam 80 is shown in FIG. 3. For the sake of brevity, a dual-layered optical disc is denoted by 501 and information recording layers are denoted by 511 and 512. The main beam 80 through the objective lens 401 makes the minimum beam spot on the information recording layer 511 so as to read out information from it. On the information recording layer 511 are formed guide grooves for tracking as shown in FIG. 4. The main beam forms the optical spot 94 that irradiates the guide groove. At the same time, the sub-beam forms the optical spots 95 and 96 that irradiate positions away from the guide track by half a track pitch. Since the irradiating light is focused on the recording layer 511, its reflected ray returns to the objective lens 401 (shown in FIG. 3) along the same optical path as the incident ray. The reflected ray further passes through the detecting lens 402 (to become the beam 801) and enters the optical detector 51. The detecting lens 402 has astigmatism, and the optical detector 51 is placed at the position where the least circle of confusion occurs.

The optical detector has a shape as shown in FIG. 5 and the reflected ray from the optical disc has an incident pattern as shown in FIG. 5. The optical detector 541 (consisting of four sections divided by a cross) shown at the center is to detect the main beam. The main beam (in the form of optical spot 811) irradiates the detector 541. The two reflected rays from the sub-beams enter (forming the optical spots 812 and 813) separately the detectors 542 and 543, each of which is divided into two sections. Signals from the detector 541 (divided into four sections) are designated as A, B, C, and D, signals from the detector 542 (divided into two sections) are designated as E and F, and signals from the detector 543 (divided into two sections) are designated as G and H. Then, the tracking error signal (TR) is expressed as follows:

$$TR=(A+B)-(C+D)-k\{(E-F)+(G-H)\}$$

where k is a constant to be determined by the ratio in intensity between the main beam and the sub-beams. Usually, the main beam is more than ten times as intensive as the sub-beams. Also, the focus error signal (AF) is expressed by $AF=A+C-(B+D)$, and the data signal (RF) is expressed by $RF=A+C+B+D$. TR and AF are used to control the position irradiated with the laser beam.

The multilayered optical disc is designed such that, when it is irradiated with a laser beam, each layer reflects approximately the same amount of light to be detected by the optical detector. Consequently, the layer close to the objective lens has a larger transmittance than the layer away from the objective lens, so that the laser beam also irradiates the layer away from the objective lens. The problem that arises under this condition is that when the laser beam is focused on the layer 511 for information retrieval as shown in FIG. 3, a portion of the laser beam (designated as the beam 82) passes through the layer 511 and then it is reflected by the adjacent layer 512. The reflected beam 83, which is stray light, returns to the objective lens 401, enters the detection lens 402, becomes condensed in front of the optical detector 51, and finally enters the optical detector 51 while spreading along the optical beam 804. The optical beam 804 forms a wide optical spot 841 on the surface of the optical detector as shown in FIG. 5. The wide optical spot 841 covers the optical detectors 541, 542, and 543, and hence it interferes with the beams 811, 812, and 813. This interference depends on the phase variation of the optical spot 841 which occurs as the interlayer distance fluctuates.

Fluctuations in the intensity of RF signals (which are the total light quantity of the beam 811) deteriorate the jitter, thereby aggravating the error rate at the time of data reading. Moreover, interference between the beam 812 and the beam 813 causes the TR signals to fluctuate. This interference produces a strong effect because the sub-beams resulting from division by the diffraction grating have a low intensity nearly equal to the power density of the main beam reflected by the adjacent layer. This interference is also affected by the inclination and interlayer spacing of the optical disc. Thus, an optical disc with an uneven interlayer spacing causes the optical spot 812 or 813 to fluctuate in the distribution of light quantity as it rotates. This affects the differential portion (E−F)+(G−H) of the TR signal, resulting in unbalanced tracking signals. This in turn causes tracking errors. Likewise, the adjacent layer 512 closer than necessary to the layer 511 being read gives rise to the reflected light that causes troublesome interference.

One technology to reduce crosstalk is disclosed in Japanese Unexamined Patent Publication No. 2008-135097. According to this disclosure, the optical system for the pickup unit is provided with the reflection region limiting mirror 43 as shown in FIG. 7. A detailed description of this optical system is given below. There is shown the semiconductor laser 101 which emits a laser beam. The laser beam is converted into a circular collimated beam by the collimator lens 403 and triangular prism 102. The collimated beam is divided into three beams, one main beam and two sub-beams, by the diffraction grating 103. The main beam travels in the same direction as the incident beam, and the sub-beams travel in the directions inclined outward from the optical axis. The three beams pass through the polarizing beam splitter 104, change into circularly polarized light through the λ/4 plate 105, and focus on the multilayered disc 501 (being turned by a rotating mechanism) through the objective lens 404. Although the multilayered disc 501 shown here is a dual-layered disc, it may be replaced by any multilayered disc having three or more layers. The active layer (for reading) is indicated by 511, and the minimum spot of laser beam exists on the layer 511. The adjacent layer 512 also emits the reflected light 83 which is stray light that causes crosstalk.

The reflected light (including stray light) from the multilayered disc returns to the objective lens 404 and then passes through λ/4 plate 105 for conversion into the linearly polarized light in the direction perpendicular to the direction of the original polarized light. The linearly polarized light is reflected by the polarizing beam splitter 104 toward the λ/4 plate 106 for conversion into the circularly polarized light, which is subsequently condensed by the reflecting light condenser lens 405 and then reflected by the reflector 43 which is placed at the position of the minimum spot of the reflected light coming from the active layer 511. The reflector 43 has a shape as shown in FIG. 8. Reference numeral 831 denotes the minimum spot of the main beam, and Reference numerals 832 and 833 denote the minimum spots of the sub-beams. Their respective minimum spots are reflected by the restricted reflection regions 431, 432, and 433. Each of the reflection regions has a peripheral region with a low reflectivity. The beam which has been reflected by the active layer and then reflected by the reflector 43 returns to the reflecting light condenser lens 405 and then passes through the λ/4 plate 106 for conversion into the linearly polarized light orthogonal to the direction of polarization of the incident light. The resulting polarized beam passes through the beam splitter 104 and further passes through the condenser lens 406 having astigmatism and finally reaches the optical detector 52 placed at the position of the least circle of confusion. The optical detector 52 has sensitive parts as shown in FIG. 5. Signals from the optical detector 52 are processed by the signal processing circuit 53, so that there are generated AF signals and TR signals to control the position of the optical spot and RF signals as data signals.

SUMMARY OF THE INVENTION

The prior technology mentioned above has the following disadvantages. As shown in FIG. 8, the stray light 841 coming from the idle layer (which is a major cause of crosstalk) irradiates a large area or irradiates those parts having a low reflectivity. This reduces the amount of light being reflected toward the detector. However, the stray light also irradiates the reflection regions 431, 432, and 433, and the reflected light coming from these regions returns to the detector, thereby causing crosstalk.

It is an object of the present invention to provide a new optical pickup device equipped with a means for eliminating the interlayer crosstalk mentioned above. The optical pickup device produces stable tracking signals and focusing error signals and also produces RF signals with an adequate level of S/N ratio.

According to the present invention, the foregoing problem is addressed by contriving a means for preventing the reflected light coming from the idle layer from irradiating the restricted reflection regions, thereby reducing interlayer crosstalk.

FIGS. 9 and 10 show how the reflected beam from the multilayered disc is divided into two beams and the two beams are condensed by the condenser lens. For the sake of brevity, each drawing shows separately the reflected beam from the active layer and the reflected light from the idle layer. In fact, however, these two beams exist simultaneously and overlap each other. The left part of each drawing depicts the reflected beam 812 (after division) from the active layer. The reflected beam 812 is condensed by the reflected light condenser lens 405, so that it forms the minimum spot on the focusing plane 524. The right part of FIG. 9 depicts the reflected beam (as stray light) from the layer closer to the objective lens than the active layer, which is condensed by the reflected light condenser lens 405. It is assumed that the reflected beam 851 entering the reflected light condenser lens 405 has been divided. The reflected beam 851 focuses at the position 525, which is away from the focusing plane 524 of the reflected beam from the active layer, because the reflecting layer is close to the objective lens. The right part of FIG. 10 depicts the condensing of the reflected beam from the reflecting layer which is far away from the active layer. The reflected beam 852 (after division) focuses at the position 526 which is closer to the reflected light condenser lens 405 than the focusing plane 524 for the reflected beam from the active layer.

FIG. 11 shows the distribution of light on the focusing plane 524 shown in FIG. 9 or FIG. 10. The reflected beam coming from the active layer consists of one main beam and two sub-beams. The main beam focuses to give the spot 821 and the sub-beams 822 and 823 focus to give the spots 822 and 823. The reflected beam coming from other layers than the active layer splits into two beams which give the light distribution divided at the center. For example, the main beam gives the light distribution 816 upon reflection by other layers, and the sub-beams give the light distribution 817 and 818 upon reflection by other layers. In any way, the central region is not irradiated with the reflected light coming from other layers. Now, if the reflection plate 431 (which has the limited reflection regions 531, 532, and 533) is installed, only the reflected beam coming from the active layer is reflected but the reflected beam coming from other layers is hardly reflected. By restricting the reflection regions as mentioned above, it is possible to detect the reflected beam coming from the active layer without being affected by stray light coming from other layers.

The optical pickup device according to the present invention has a laser source, an irradiating beam condensing optical system (which focuses the laser beam from the laser source on one of the recording layers for the multilayered optical information recording medium), and a detecting optical system (which detects the reflected light coming from the recording layer of the multilayered optical information recording medium). The detecting optical system includes a dividing optical system (which divides in parallel the reflected beam coming from the recording layer), a reflected beam condenser lens (which focuses the divided reflected beams), a reflecting region limited reflection plane (which is placed at the position for the minimum spot of the reflected beam coming from the desired recording layer, the reflected beam being one of the reflected beams focused by the reflected beam condenser lens), and a detector (which detects the reflected beam), so that the reflected beam reflected by the reflection plane is detected by the optical detector.

Alternatively, a beam splitter and an objective lens are arranged in the optical path of the irradiating beam condensing optical system, the irradiating beam condensing optical system and the detecting optical system have the beam splitter and the objective lens, and the irradiating beam condensing optical system permits the laser beam from the laser source to pass through the beam splitter. And, the detecting optical system has a dividing optical system (which divides the reflected beam coming from the recording layer into both sides of the optical axis in such way that the divided beams do not pass along the optical axis immediately after division but gradually converge to the optical axis), a reflecting region limited reflection plane (which is placed at the position for the minimum spot of the reflected beam coming from the desired recording layer), the reflected beam being one of the reflected beams which have passed through the dividing optical system, and an optical detector (which detects the reflected beam), so that the reflected beam reflected by the reflection plane is detected by the optical detector.

The reflecting region limited reflecting plane, which is placed at the position where the reflected beam coming from the active layer is focused, reflects the reflected beam combing from the active layer but does not reflect the reflected beam coming from the idle layers.

The optical pickup device according to the present invention prevents the reflected beam coming from the idle layers from entering the optical detector. Thus it reduces the effect of interlayer crosstalk on the tracking error signal, focus error signal, and RF signal.

Moreover, it also prevents the interlayer crosstalk from increasing despite a large lens shift if the intervals of division of the beam are increased, and it can be applied to any multilayered disc with a narrow interlayer space.

DESCRIPTION OF THE PREFERRED EMBODIMENTS

Figure 14:
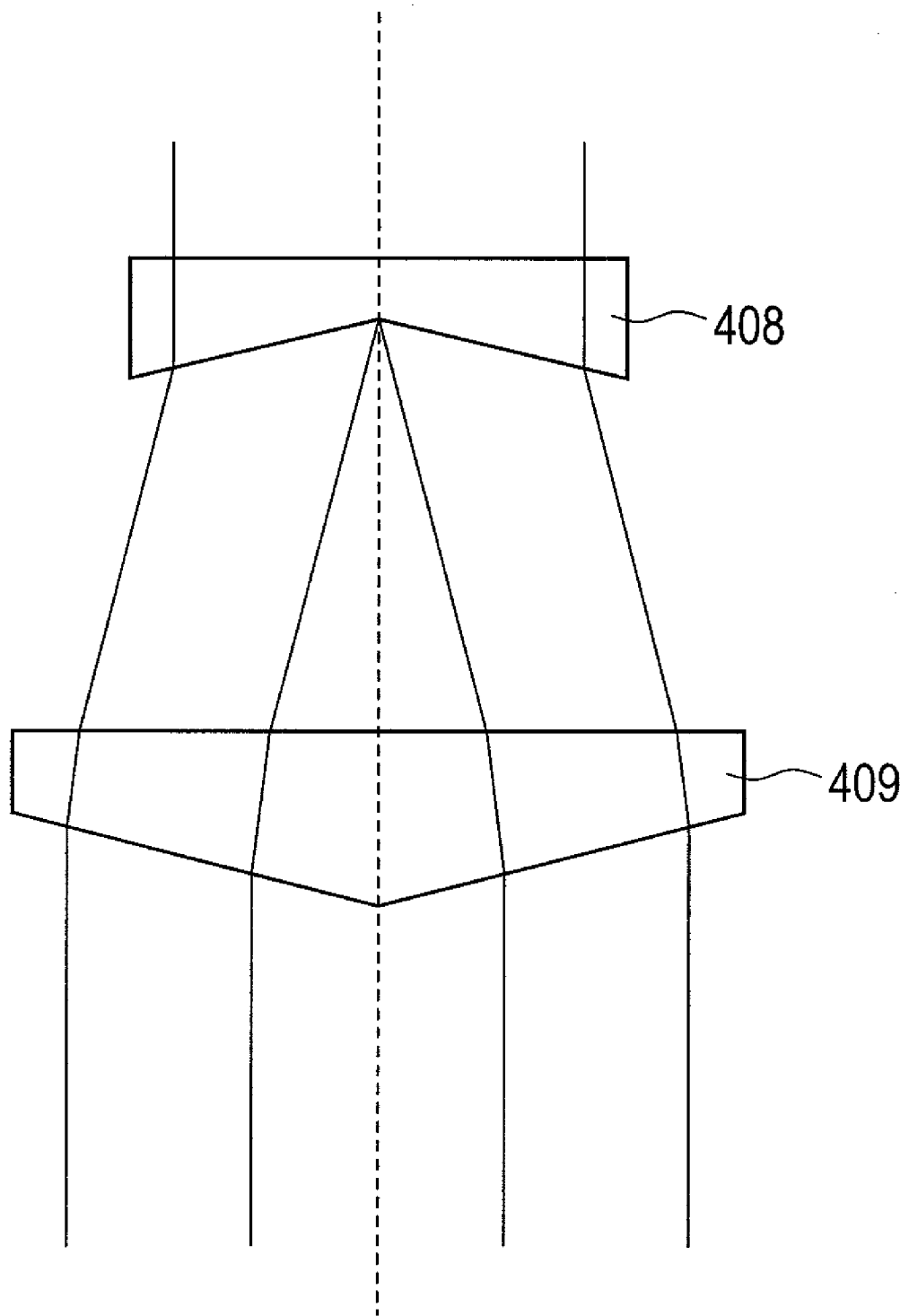
FIG. 14 is a diagram illustrating a dividing optical system with two biprisms.

The following is a description of the dividing optical system. FIG. 14 is a diagram illustrating the dividing optical system which divides the beam by means of two biprisms. The first biprism 408 receives a parallel beam and then produces parallel beams which proceed in the direction at the same angles symmetric to the optical axis. The second biprism 409 makes the parallel beams (at an angle with respect to the optical axis) parallel to the optical axis. These two biprisms can convert the ordinary beam into two divided parallel beams.

Figure 6:
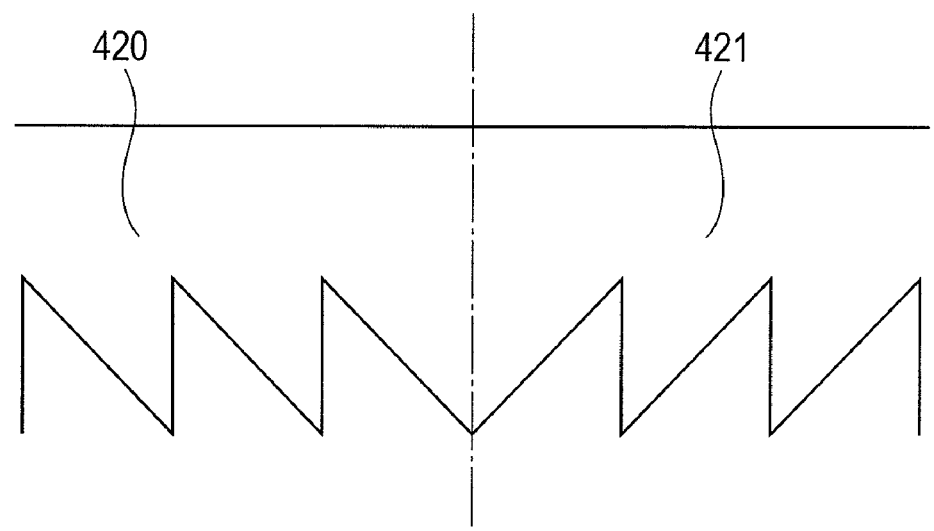
FIG. 6 is a diagram illustrating the serrated shape of the grating.
Figure 13:
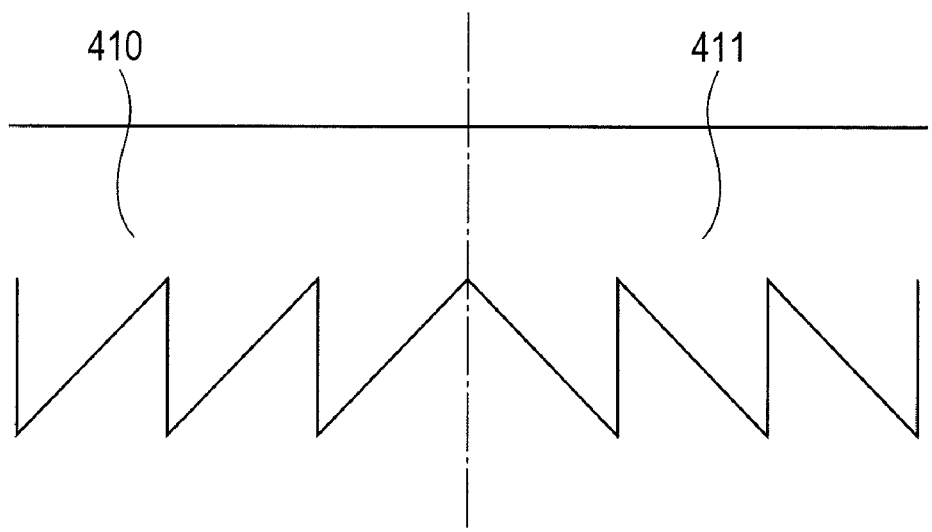
FIG. 13 is a diagram illustrating the serrated shape of the grating.
Figure 15:
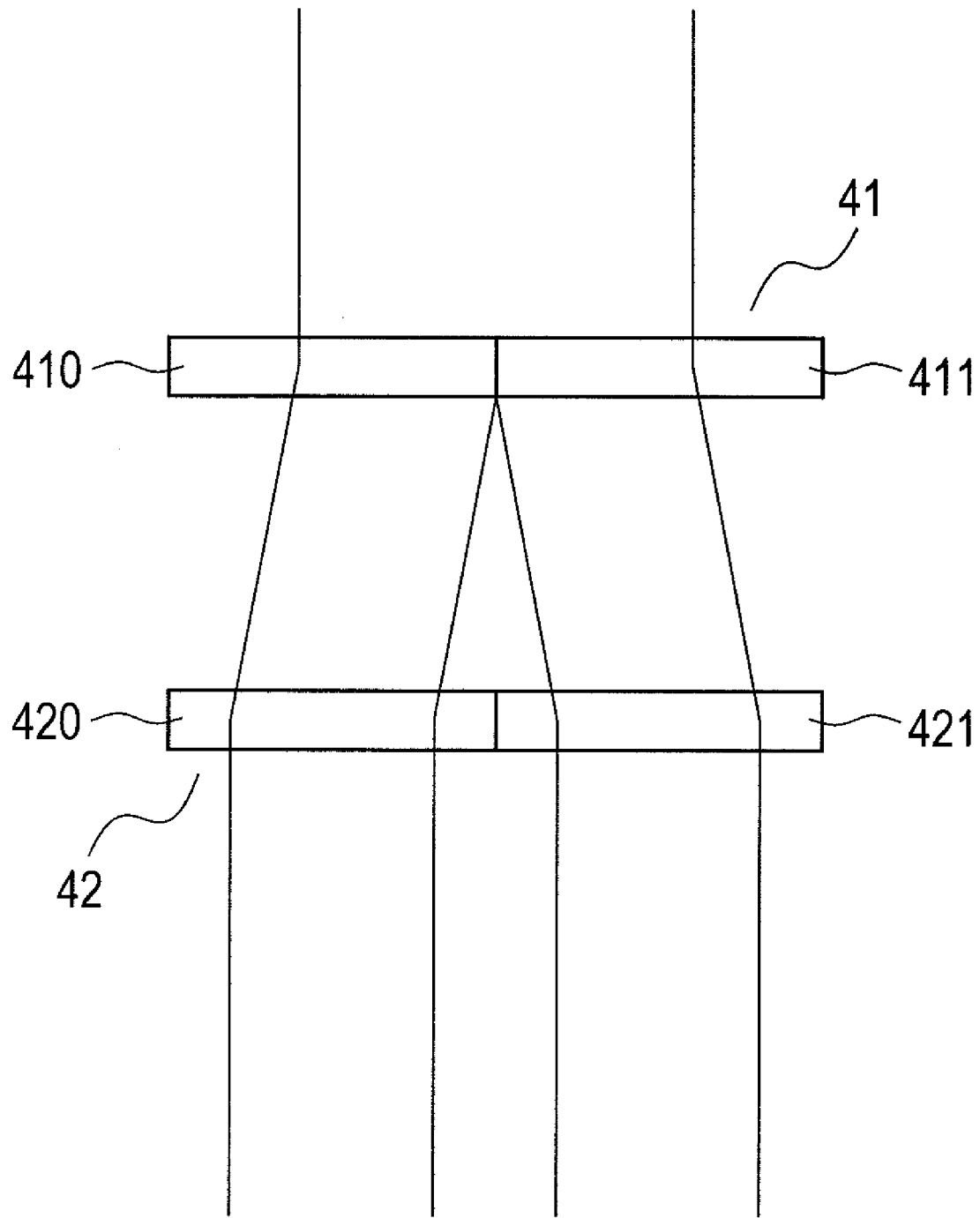
FIG. 15 is a diagram illustrating a dividing optical system with two dividing gratings.

FIG. 15 is a diagram illustrating the dividing optical system which employs two transmitting gratings 41 and 42 to divide a beam into two parallel beams. Each of the gratings 41 and 42 consists of two regions differing in the direction of diffracted light, but the two regions have the same groove direction as the dividing line and also have the same groove pitch. The grating has the serrated shape whose groove depth is $1/(n-1)$ so that it does not give the zeroth light. (n denotes the refractive index of the grating measured in the air.) The grating will not give the zeroth light even though its groove depth is an integral multiple of the foregoing one. FIG. 13 is a diagram illustrating the serrated shape of the grating 41. The direction of teeth is inverted in the regions 410 and 411. The grating 41 gives the diffracted beams which are symmetrical to the optical axis. As the result of diffraction in this manner causes the incident beam to emit in different directions from the two regions. FIG. 6 is a diagram illustrating the serrated shape of the grating 42. The grating 42 receives the downward beam. The sections 421 and 410 have the same serrated shape and the sections 420 and 411 have the same serrated shape. The beam incident to the grating 41 is divided into two beams which have an angle with respect to the optical axis, and two divided beams pass through the grating 42 and become parallel to the optical axis, with a certain distance away from each other.

Figure 16:
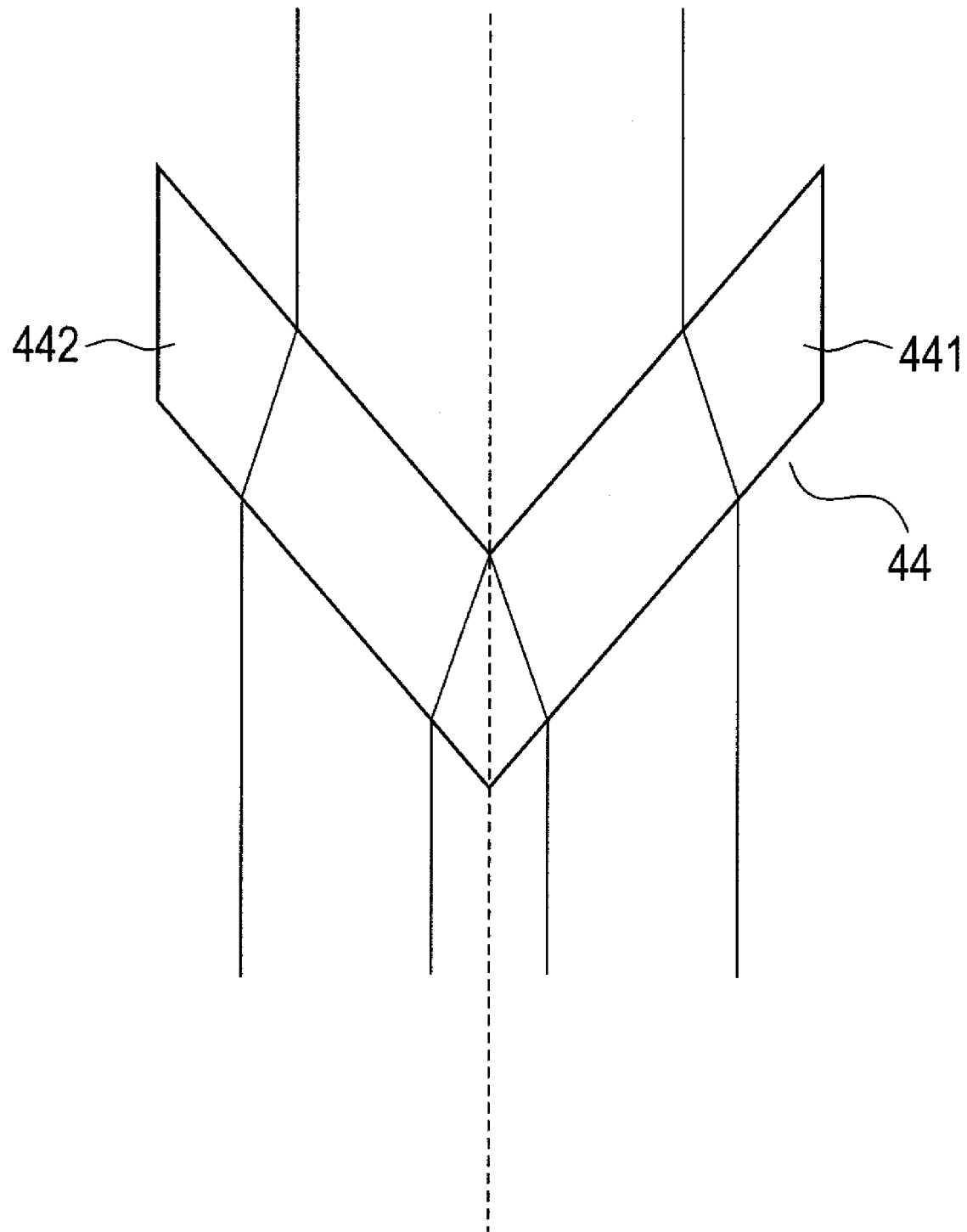
FIG. 16 is a diagram illustrating a dividing optical system with two parallel flat plates.

FIG. 16 is a diagram illustrating the dividing optical system which employs two parallel flat plates. The dividing element 44 consists of two parallel flat plates 441 and 442, which are inclined at the same angle toward the optical axis and are arranged at positions symmetrical to the optical axis. The two parallel plates join together to form the ridge line perpendicular to the optical axis. The ridge line or trough line at the joint of the parallel plates passes through the center of the main beam and sub-beams and extends in the direction perpendicular to the optical axis. The downward incident beam is divided into two portions at the trough line, and the divided beams enter the separate parallel flat plates. The parallel flat plates may be made of transparent glass or plastics (which have a larger refractive index than air), so that the beam (at the incident plane) advances in the direction away from the plane containing the trough line and the optical axis and it becomes parallel to the optical axis (at the emergent plane).

The foregoing description is based on an assumption that the dividing optical system is placed in the parallel light flux; however, it may also be placed in the converging light flux behind the reflection light condenser lens. For example, in the case of the optical system shown in FIG. 16, the angle of the incident plane and the angle of the emergent plane are identical with each other; however, in the case mentioned above, the angle of the incident plane and the angle of the emergent plane are different from each other. In both cases, the same effect will be produced.

The invention will be described with reference to the following embodiments.

First Embodiment

Figure 1:
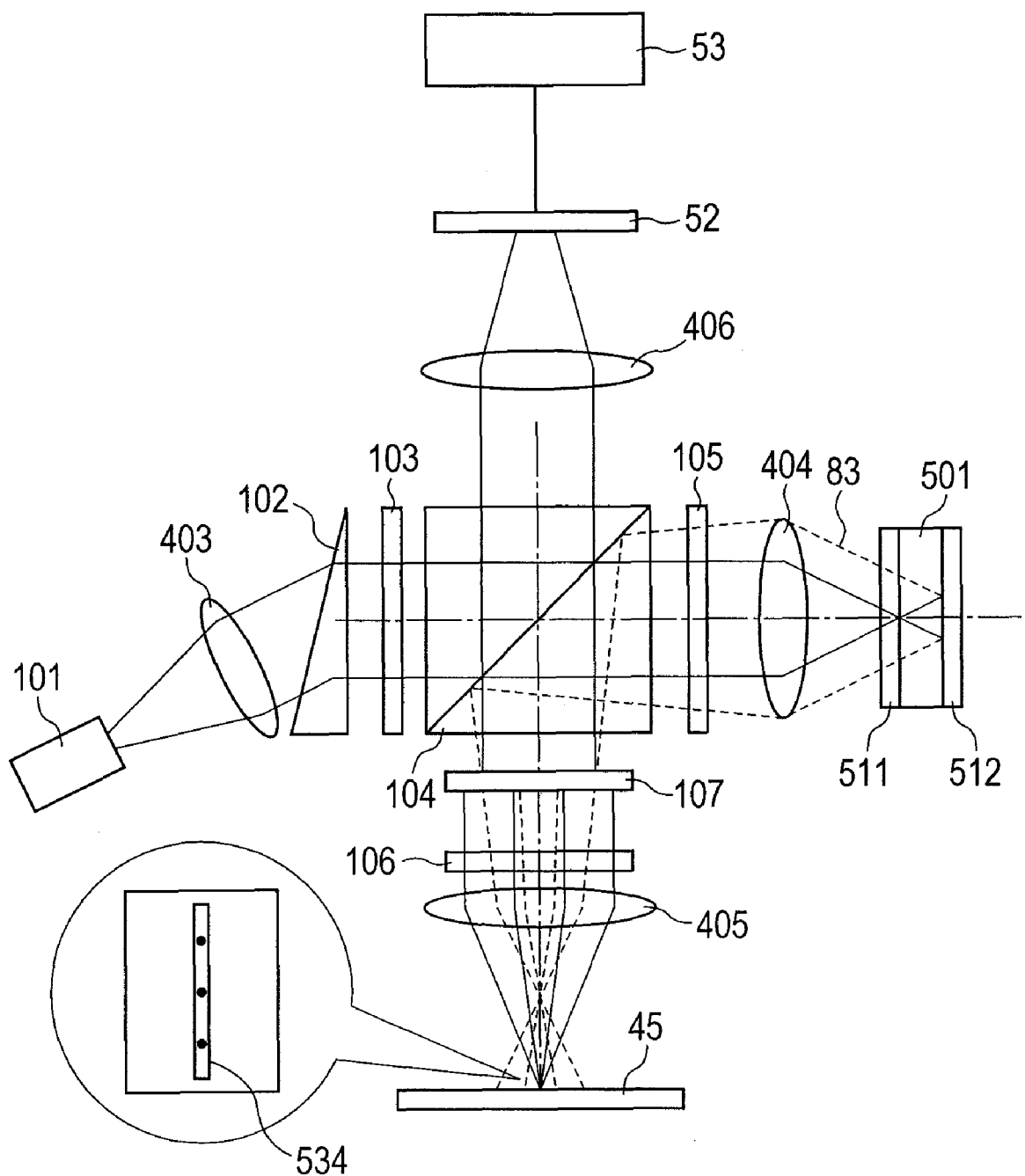
FIG. 1 is a diagram illustrating one example of the optical system of the optical pickup device according to the present invention.
Figure 7:
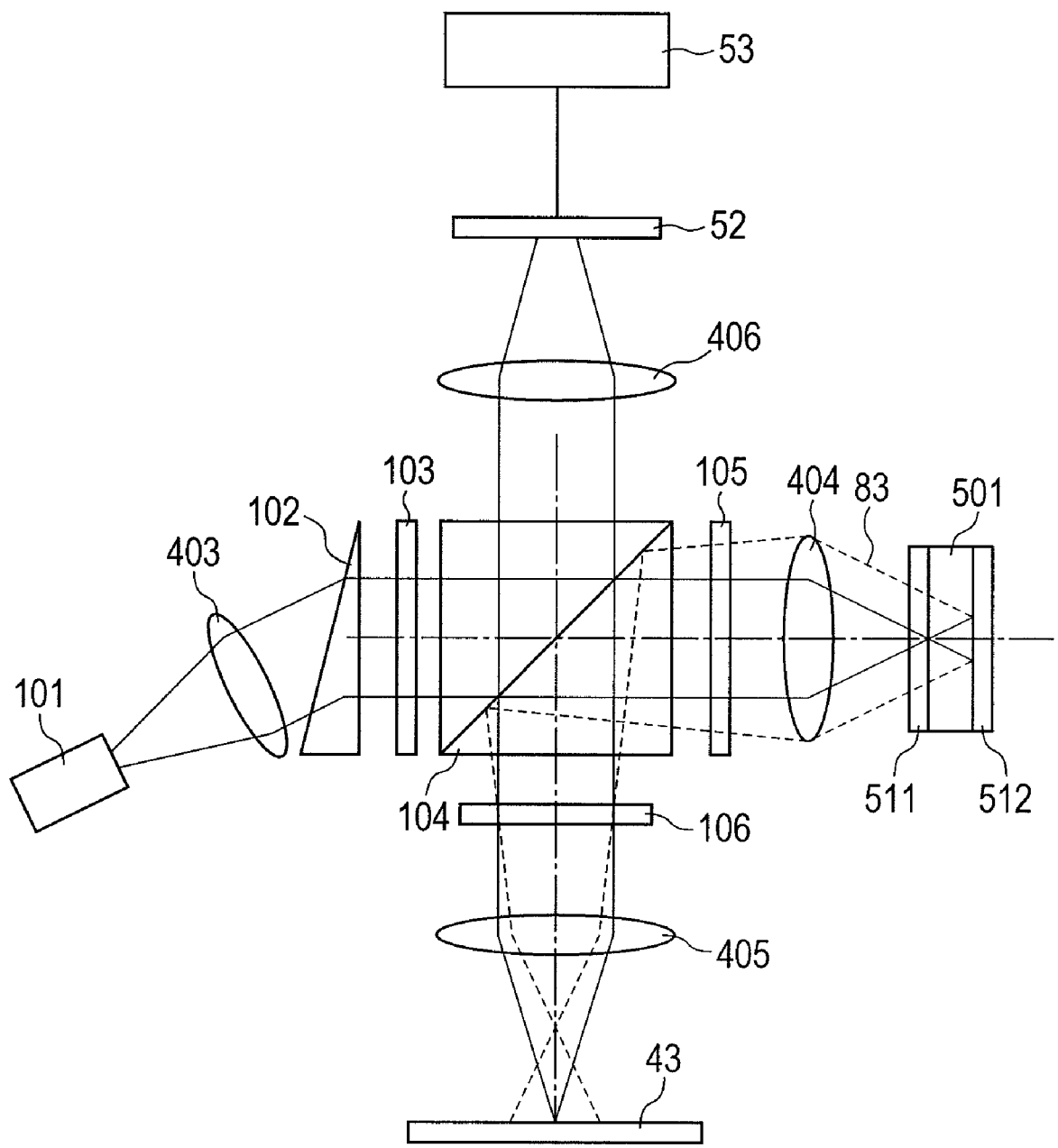
FIG. 7 is a diagram illustrating the optical system of an optical pickup device which employs a reflecting plane having the limited reflection region.
Figure 8:
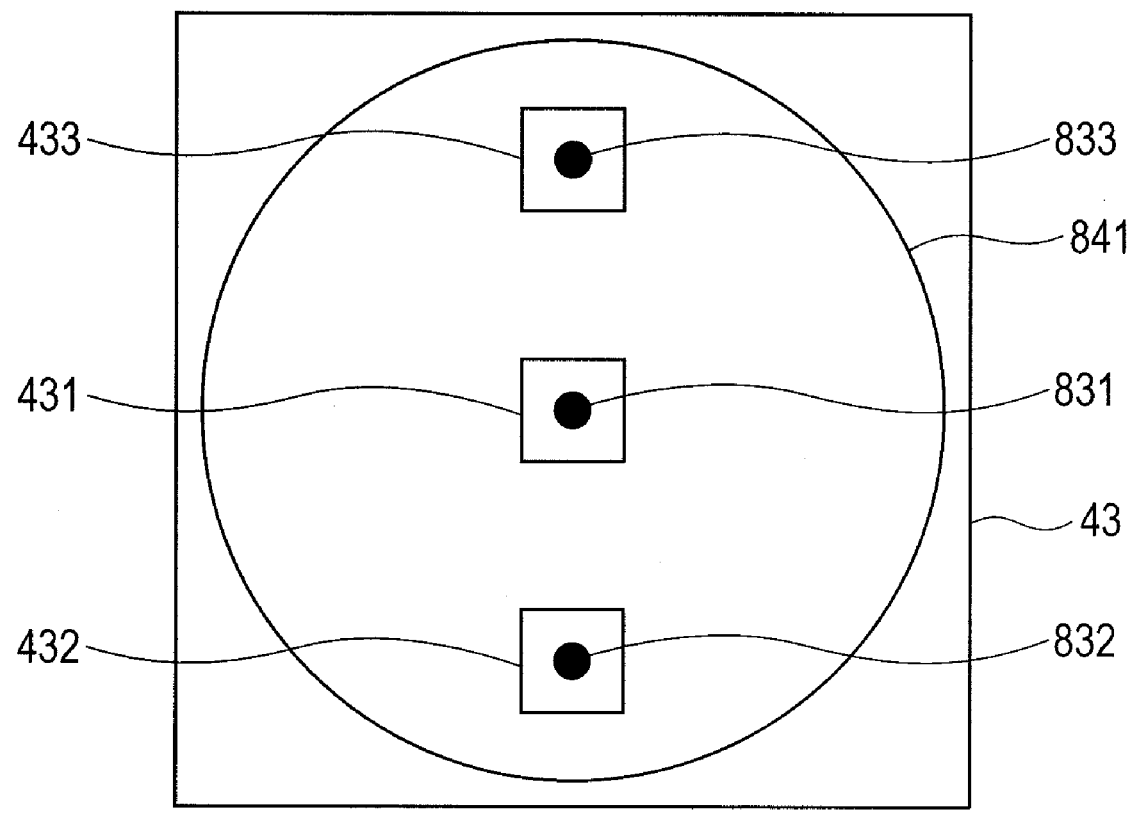
FIG. 8 is a diagram illustrating a reflecting plane having the limited reflection region.
Figure 9:
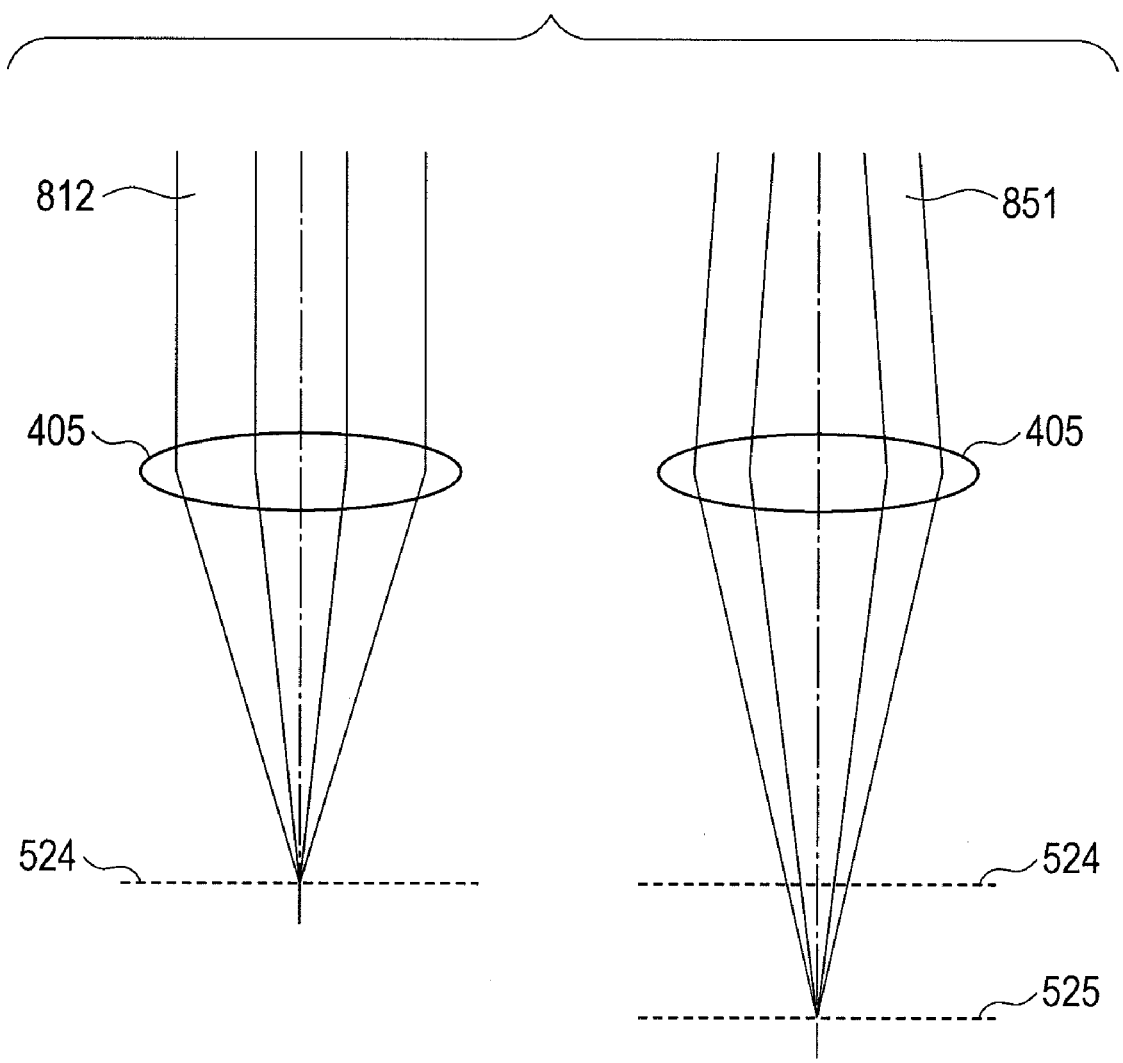
FIG. 9 is a diagram illustrating how divided reflection beams are condensed.
Figure 10:
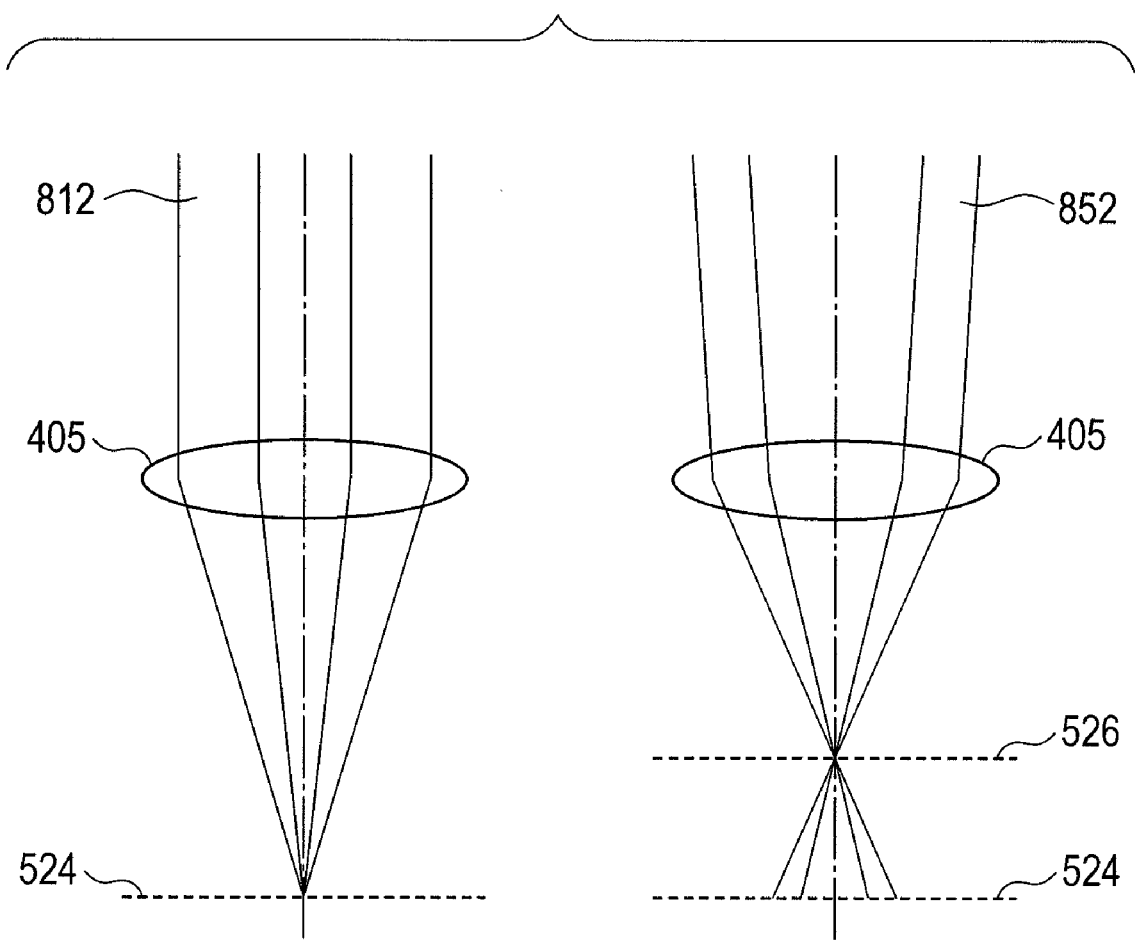
FIG. 10 is a diagram illustrating how divided reflection beams are condensed.
Figure 11:
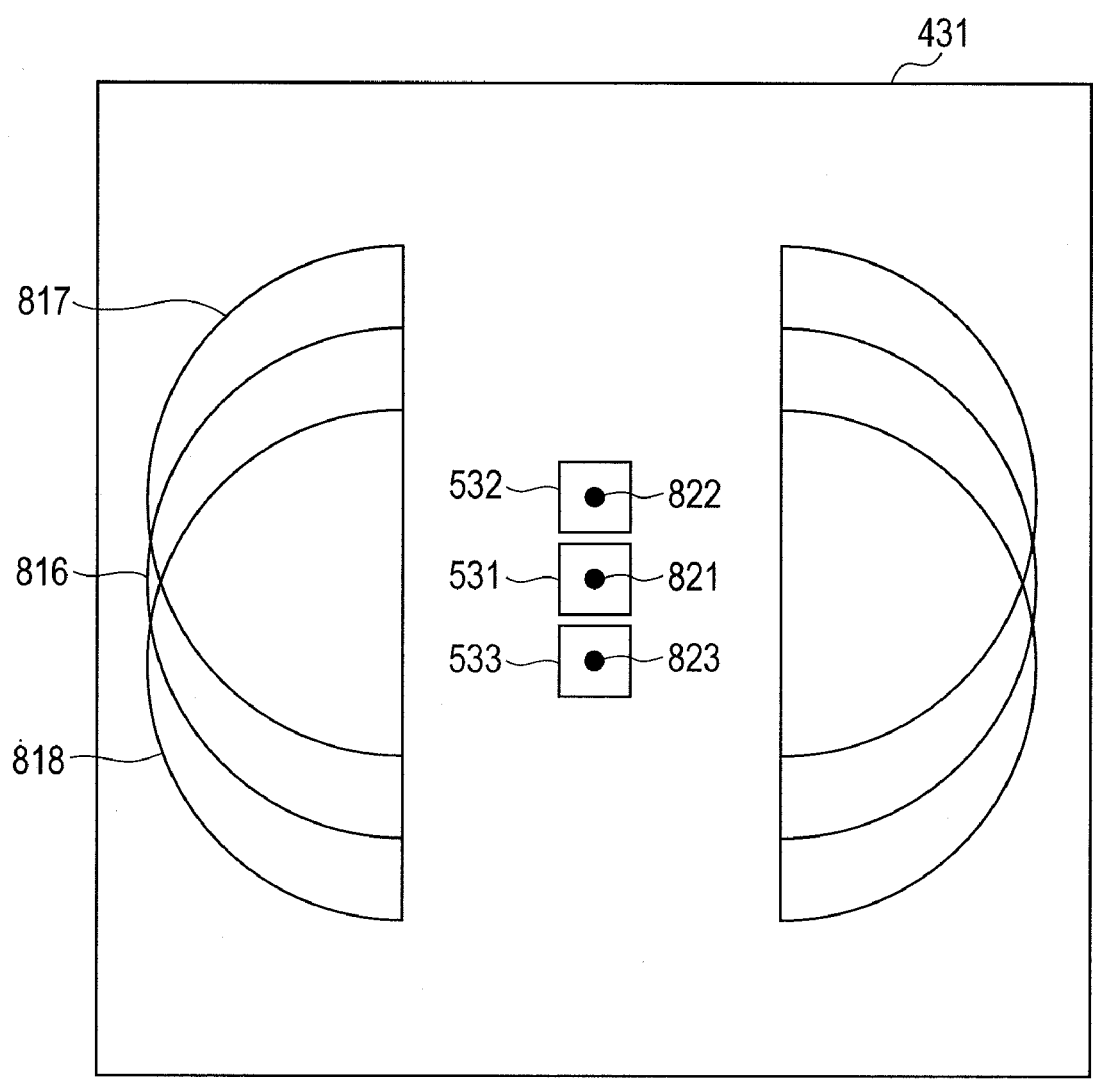
FIG. 11 is a diagram illustrating how divided parallel beams of the main beam and sub-beams reflected by the active layer are condensed by the reflection condenser lens and also illustrating the distribution of the reflected beams coming from the idle layer.

FIG. 1 is a diagram illustrating the optical system of the optical pickup device according to a first embodiment of the present invention. The optical system includes the one shown in FIG. 7 and the dividing optical system 107 incorporated thereinto. This structure causes the reflected beam coming from the multilayered disc 501 to be converted into a beam which has a hollow central portion. The reflection plate 43 may be used, but, in this embodiment, it is replaced by the reflecting region limited reflection plate 45. The reflection region takes on an elongated rectangular shape as indicated by 534. It reflects the reflected beam coming from the active layer. The rectangular reflection region is not specifically restricted in its length so long as it is not irradiated with stray light. The rectangular reflection region is irradiated with the main beam and sub-beams coming from the active layer as indicated by black spots. Reflection takes place at these spots. The reflected light coming from the active layer is divided into parallel beams, which subsequently return to the reflected light condenser lens 405 and pass through the dividing optical system 107, thereby returning to the ordinary undivided state. The reflected light that emerges from the dividing optical system 107 passes through the polarized beam splitter 104 and the condenser lens 406 having astigmatism, and it is finally detected by the optical detector 52. The reflected beams coming from the idle layer do not irradiate the rectangular reflection region, and hence they do not return to the reflected light condenser lens 405 and they do not reach the optical detector 52. Thus the interlayer crosstalk does not occur. Incidentally, upon reception of the beam, the optical detector activates the signal processing circuit 53 to generate FR signals, etc.

The rectangular reflection region should be wider than the spot of the reflected beam within the focusing range of the active layer. If the spot is large, the focusing range becomes narrow, resulting in interlayer jump and unstable focusing. For example, if it is assumed that the focusing range is 3 μm and the optical power of the objective lens and reflected light condenser lens is 10 magnifications, the width of the elongated rectangle should be 60 μm. Thus the biprism should be designed such that the reflected beams coming from the idle layer do not fall on the rectangular region.

Figure 5:
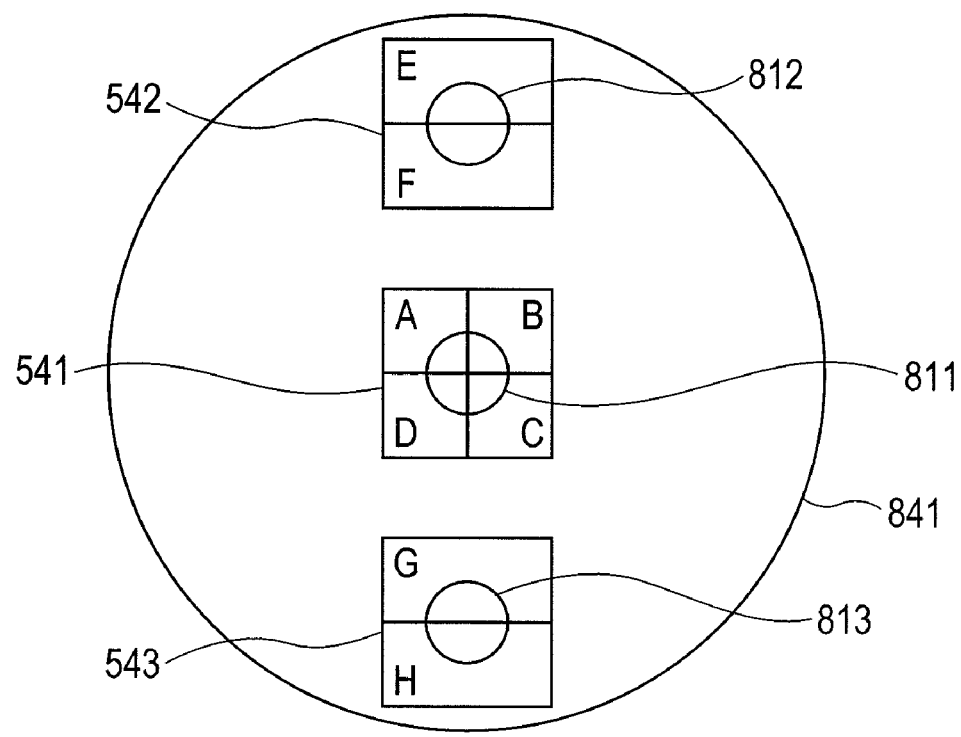
FIG. 5 is a diagram illustrating the shape of the optical detector and the position of the light spot of the reflected beam coming from the optical disc.

The dividing optical system 107 that can be used is any one of those shown in FIGS. 14 to 16. The dividing optical system shown in FIG. 15 may be replaced by a polarizing diffraction element. In this case, a provision should be made such that it performs diffraction only on the beam traveling from the polarizing beam splitter 104 to the dividing optical system 107 but not on the beam which is polarized by 90° upon returning from the λ/4 plate (106). Detection is performed in such a way that the beam is divided; however, the amount of light incident to the divided detectors (shown in FIG. 5) is the same as that in the case where the beam is not divided. Therefore, this is no possibility of problems with the RF signals and control signals. The advantage of using the polarizing diffraction grating is that the dividing element produces only a minimum effect on the reflection plate 45 which is inclined or displaced in the direction of the optical axis. The elongated rectangular reflection surface is constructed such that its lengthwise direction coincides with the dividing direction of the dividing optical system mentioned above.

Figure 17:
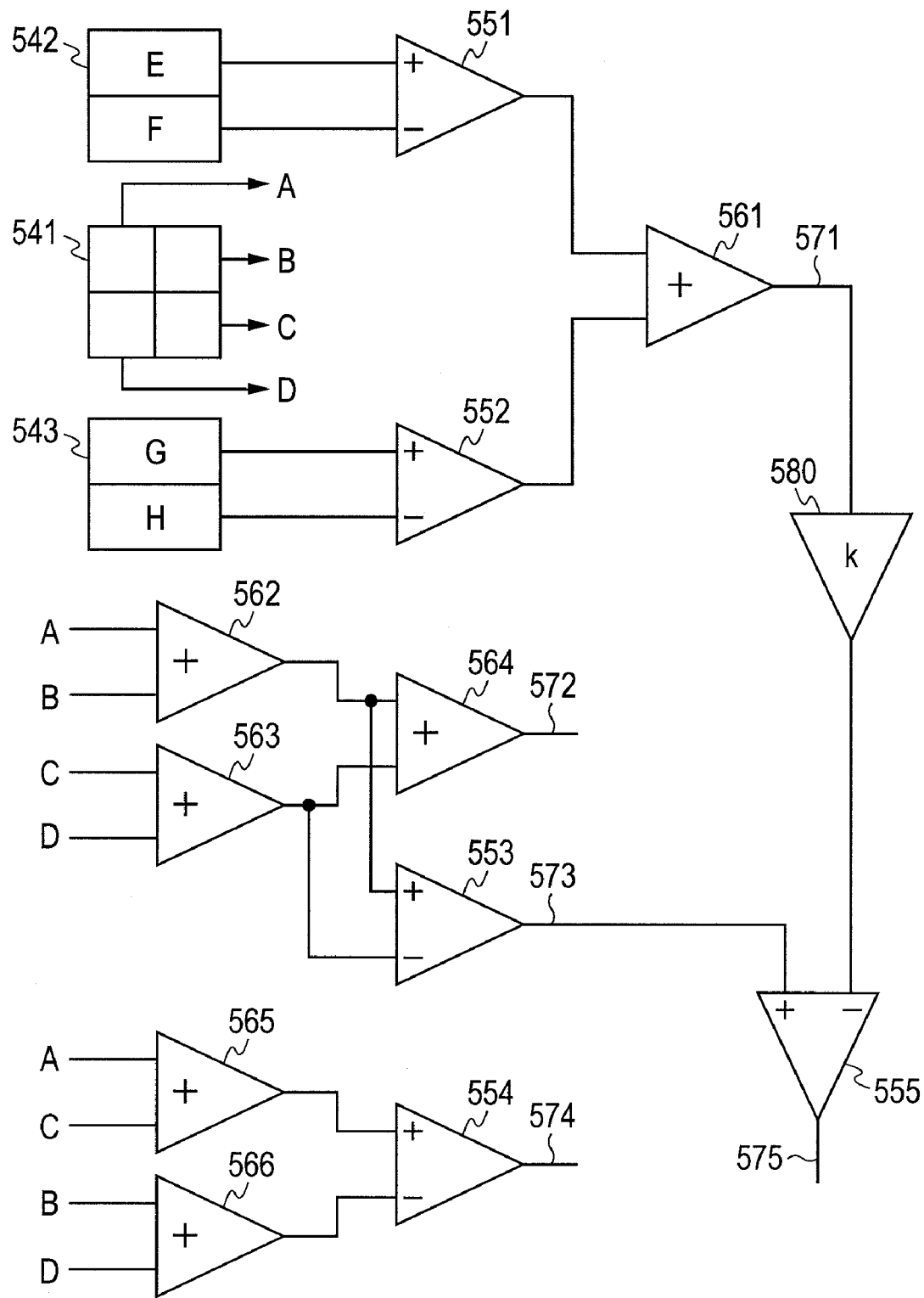
FIG. 17 is a schematic diagram illustrating the signal processing circuit.

FIG. 17 shows the electronic circuit for signal processing. The optical detectors 541, 542, and 543 are the same as those shown in FIG. 5. The four-section detector 541 detects the main beam, and the two-section detectors 542 and 543 detect the sub-beams. There are shown the differential amplifiers 551 to 555 and the adding circuits 561 to 566. There is also shown the amplifier 580 with an amplification factor of k (which depends on the ratio of the intensity of the main beam to the intensity of the sub-beams). Signals from individual detectors are amplified by preamplifiers and processed by the electronic circuits for conversion into control signals or data signals. The signals A, B, C, and D from the four-section detector are combined into the signal 572 which represents data signals. The signal 574 becomes the AF signal for the astigmatic method. The signal 573 is the push-pull signal due to the main beam. The signal 571 is the push-pull signal due to the sub-beams. The signal 571 is amplified by the amplifier with an amplification factor of k and then processed by the differential amplifier 555 together with the push-pull signal 573 due to the main beam, so that it is converted into the TR signal 575.

According to the first embodiment mentioned above, the interlayer crosstalk into the RF signal decreases and hence the S/N ratio of the RF signals improves, thereby giving data signals with limited errors. At the same time, the system mentioned above reduces the fluctuation of tracking errors which is caused by variation in the interlayer space. In other words, an interference occurs between the reflected light of the main beam from the adjacent layer and the reflected light of the sub-beams from the active layer for tracking, and, as the result, the phase difference fluctuates according to the interlayer space and the sub-push-pull signal fluctuates. However, the effect of the reflected light from the adjacent layer can be reduced according to the present invention, and the fluctuation of the tracking error signals decreases. Thus, it becomes possible to accurately control the position for laser irradiation and it is possible to accurately determine the position of laser irradiation for data reading and writing. This leads to improved signal quality.

In the first embodiment, the polarizing optical system is employed; however, if the maximum output of the semiconductor laser has a sufficient margin, the polarized light beam splitter 104 may be replaced by the ordinary beam splitter and an optical system, with the λ/4 plates 105, 106 removed, may be employed.

Second Embodiment

Figure 2:
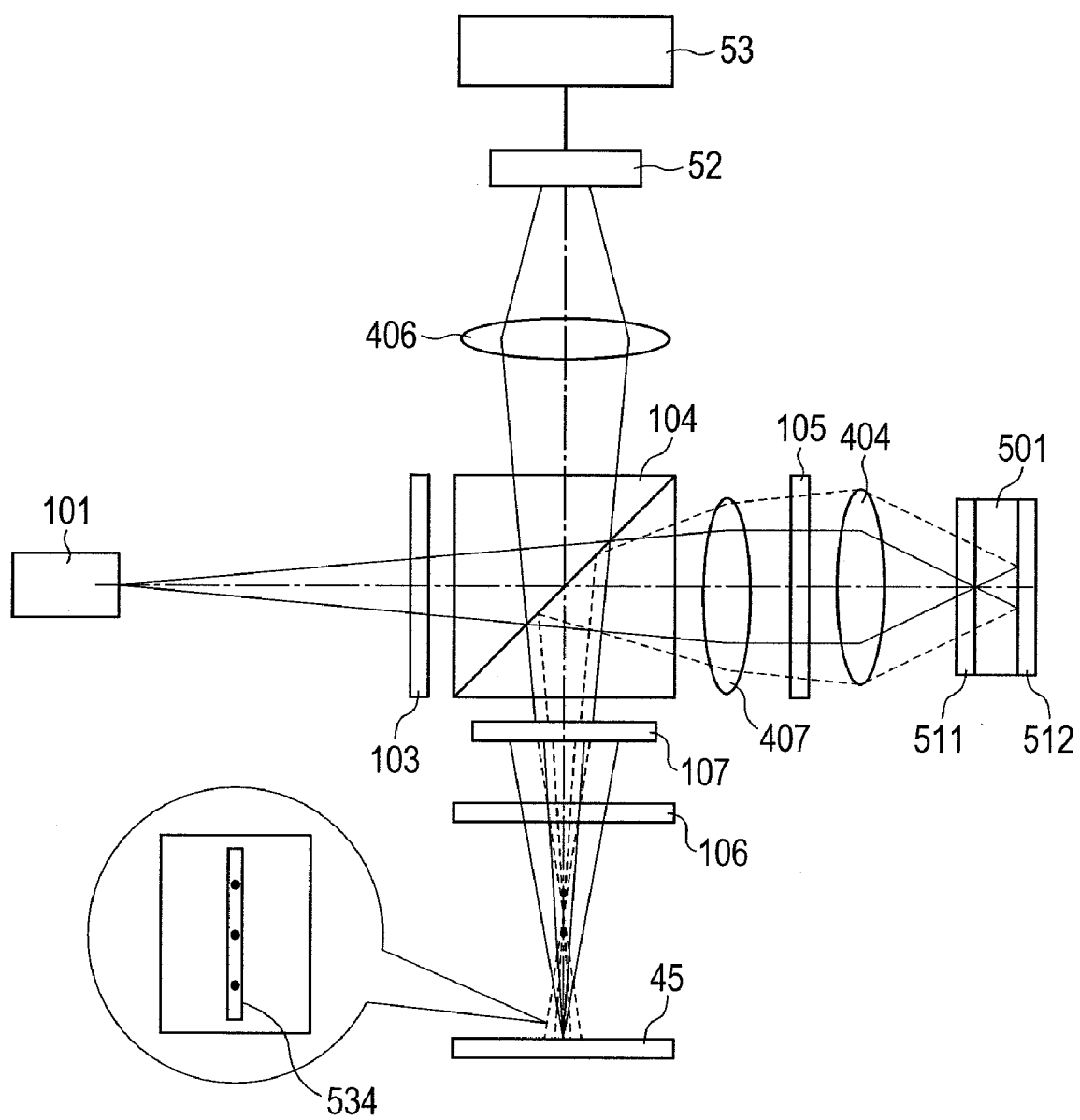
FIG. 2 is a diagram illustrating another example of the optical system of the optical pickup device according to the present invention.
Figure 3:
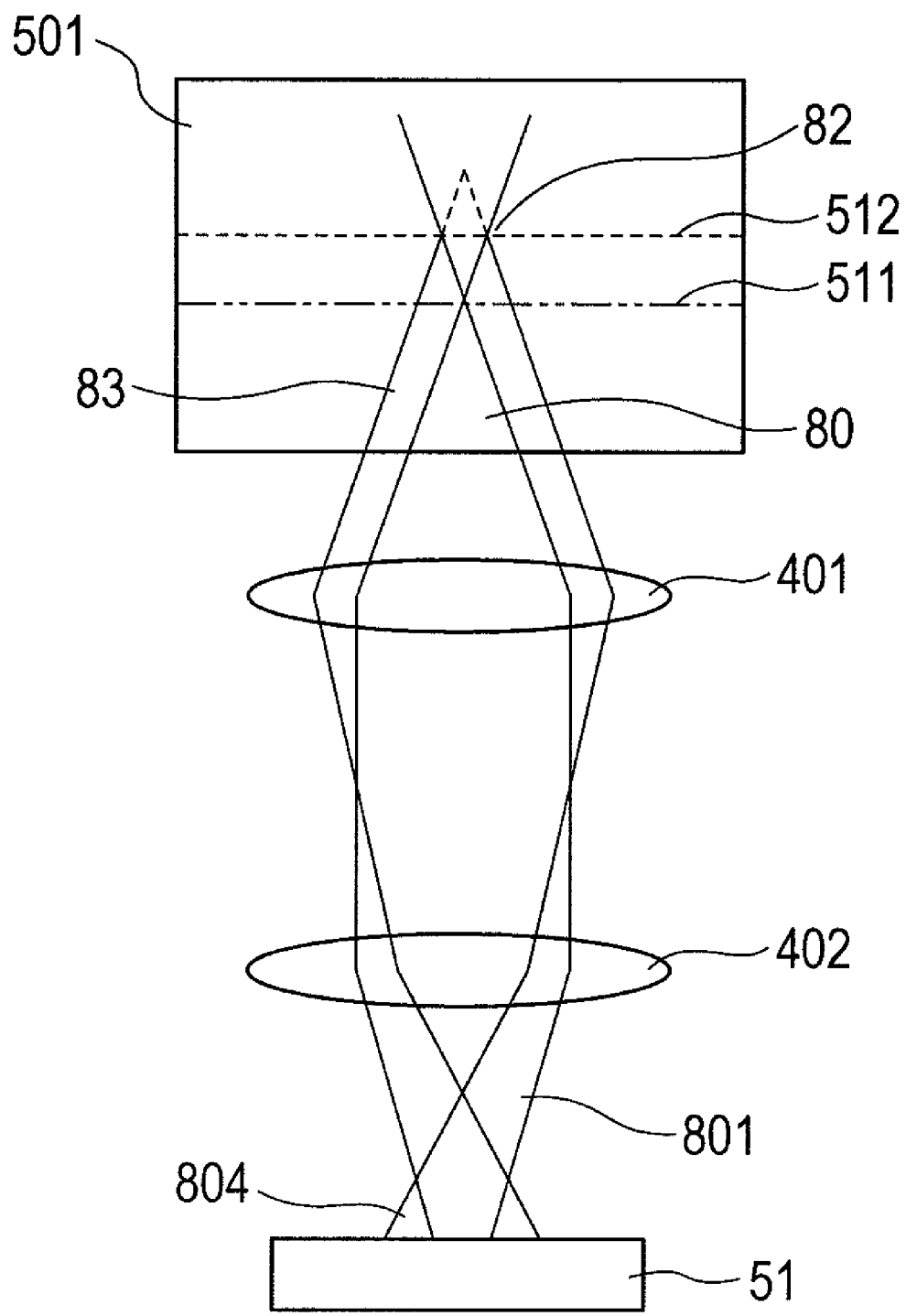
FIG. 3 is a diagram illustrating the effect of reflected beam coming from the adjacent layer.
Figure 4:
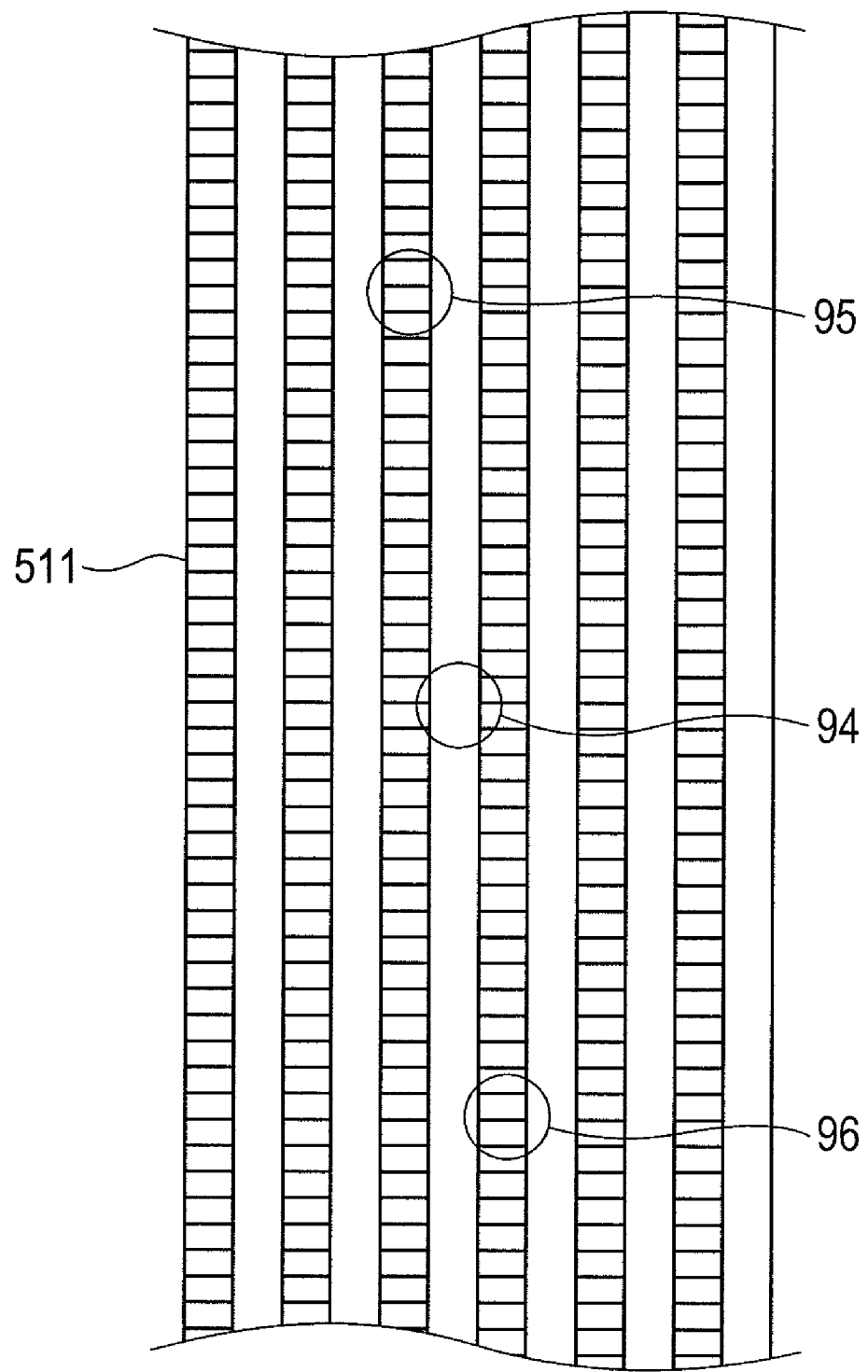
FIG. 4 is a diagram illustrating the grooved recording surface being irradiated with one main beam and two sub-beams.

FIG. 2 is a diagram illustrating the optical system of the optical pickup device according to a second embodiment of the present invention. This embodiment is characterized in that the diffraction grating 103 and the polarized beam splitter 104 are arranged closer to the semiconductor laser 101 than the collimator lens 407. Therefore, the laser beam emerging from the semiconductor laser 101 diverges and pass through the polarized beam splitter 104, gets collimated by the collimator lens 407, and enters the λ/4 plate 105. In the case of a multilayer disc, there exists different spherical aberration when the depth of the active layer from the disc surface varies; however, this aberration is compensated as the collimator lens 407 is moved along the optical axis. In the case of the first embodiment, the diffraction grating 103 and the polarized beam splitter 104 are arranged between the collimator lens 403 and the objective lens 404 and hence the condenser lens 405 is necessary. By contrast, in the case of the second embodiment, as shown in FIG. 2, the reflecting beam coming from the active layer 511 for reading of the multilayered disc 501 passes through the collimator lens 407 to become a converging beam. This obviates the necessity of the condenser lens, which leads to a reduction in the number of parts.

The dividing optical system 107 may be the same one as shown in FIGS. 14 to 16 in the first embodiment. The grating for the dividing optical system shown in FIG. 15 may be the polarizing diffraction element as in the first embodiment. In the case of the first embodiment, the reflected light coming from the active layer 511 emerges in the form of parallel beam from the dividing optical system 107; however, in the case of the second embodiment, the reflected light coming from the active layer 511 emerges in the form of converging light from the dividing optical system 107.

Third Embodiment

Figure 12:
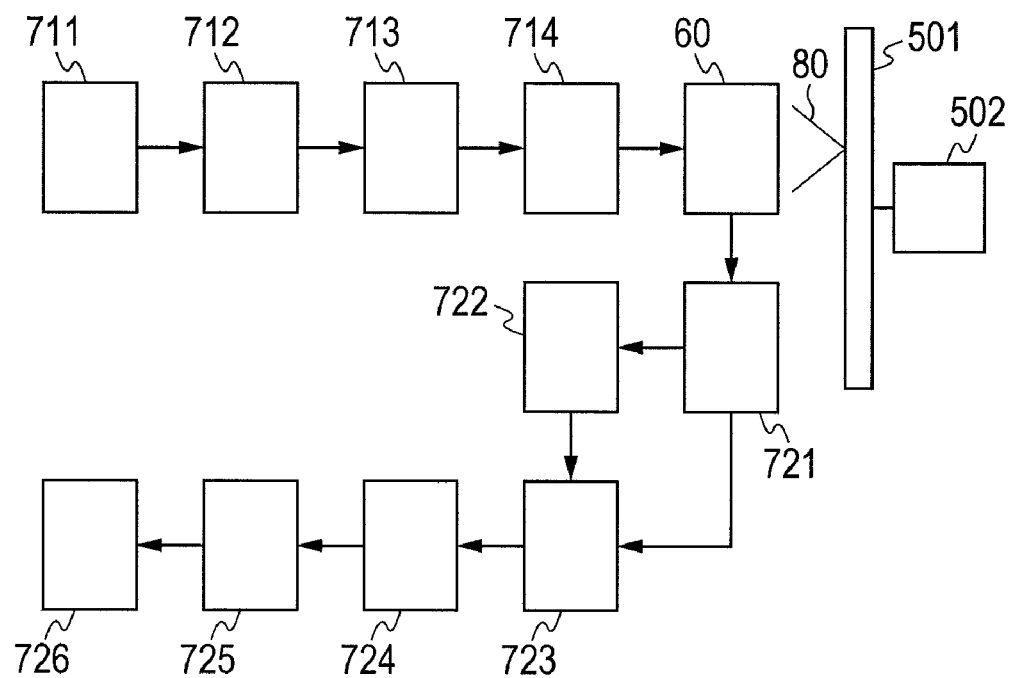
FIG. 12 is a diagram illustrating one example of the optical disc drive unit provided with the optical pickup device according to the present invention.

FIG. 12 shows an embodiment of the optical disc drive unit capable of reducing interlayer crosstalk. The circuits 711 to 714 are intended to record data on the multilayered optical disc 501. The error correction coding circuit 711 adds correcting codes to data. The record coding circuit 712 modulates data in the 1-7 PP mode. The record compensating circuit 713 generates pulses for writing suitable for mark length. According to the thus generated pulse train, the semiconductor laser driving circuit 714 drives the semiconductor laser in the optical pickup 60 and modulates the laser beam 80 emitting from the objective lens. The optical disc 501, which is turned and driven by the motor 502, has a phase changing film formed thereon, which becomes amorphous upon heating by the laser beam and subsequent quenching and becomes crystalline upon slow cooling. These two states differ in reflectivity and hence form marks. In the writing state, high-frequency superimposing (which lowers the coherency of the laser beam) is not performed and hence interference is liable to occur between the reflected light from the adjacent layer and the reflected light from the active layer. Therefore, unless an adequate measure is taken to reduce the fluctuation of SPP, there is the possibility that tracking is displaced or data in the adjacent track is deleted. In this third embodiment, the optical pickup 60 is equipped with any of the optical pickups explained in the first and second embodiments; therefore, there is no possibility of tracking troubles even in the case of multilayered disc.

The circuits 721 to 726 are intended for data reading. The equalizer 721 improves the S/N ratio in the neighborhood of the shortest mark length. This signal is sent to the PLL circuit 722 for clock extraction. The data signal which has been processed by the equalizer is digitized by the A-D converter 723 in synchronism with timing of the extracted clock. The PRML (Partial Response Maximum Likelihood) signal processing circuit 724 carries out Viterbi decoding. The record decoding circuit 725 performs decoding according to the modulation rule of 1-7 PP mode and restores data by the error-correcting circuit 726.

Although the third embodiment is concerned with a double-layered disc, it can be effectively applied to multilayered discs having three or more layers, as a matter of course.

The present invention provides an optical pickup device which eliminates interlayer crosstalk, thereby resulting in an improved S/N ratio of RF signals, removal of crosstalk from other layers, and high-quality data signals with a minimum of errors.

What is claimed is:

1. An optical pickup device comprising:
a laser source;
an irradiating beam condensing optical system which focuses the laser beam from the laser source on one of the recording layers for the multilayered optical information recording medium; and
a detecting optical system which detects the reflected light, coming from the recording layer of the multilayered optical information recording medium,
wherein the detecting optical system includes:
a dividing optical system which divides in parallel the reflected beam coming from the recording layer in such a way that the light flux after division does not travel along the optical axis;
a reflected beam condenser lens which focuses the reflected beams divided by the dividing optical system;
a reflecting region limited reflection plane which is placed at the position for the minimum spot of the reflected beam coming from one of the recording layers, the reflected beam being one of the reflected beams focused by the reflected beam condenser lens; and
an optical detector which detects the beam reflected by the reflecting region limited reflection plane, and
wherein the reflecting region limited reflection plane reflects the reflected beam coming from one of the recording layers but not to reflect the reflected beams coming from other recording layers.

2. The optical pickup device according to claim 1, further comprising an optical element which divides the laser beam into a main beam and sub-beams and the respective condensed spots are reflected by the reflecting region limited reflection plane.

3. The optical pickup device according to claim 2, wherein the detecting optical system has astigmatism.

4. The optical pickup device according to claim 1, wherein the dividing optical system includes two biprisms arranged along the optical axis.

5. The optical pickup device according to claim 1, wherein the dividing optical system includes two grating elements arranged along the optical axis, the two grating elements being divided at the plane containing the optical axis, the grating elements having a serrated groove shape, the groove having a depth enough to suppress the zeroth light and being symmetric with the plane containing the optical axis.

6. The optical pickup device according to claim 1, wherein the dividing optical system includes two flat planes joined together such that their joint forms a ridge line perpendicular to the optical axis and they form the same angles with respect to the optical axis and another two flat planes which are arranged as if the two flat planes are moved by parallel translation.

7. The optical pickup device according to claim 1, wherein the reflecting surface takes on an elongated rectangular shape, with its lengthwise direction coinciding approximately with the dividing direction of the dividing optical system.

8. The optical pickup device according to claim 1, wherein the reflection region of the reflecting plane has a size such that it contains the irradiating region of the reflected light when the beam is condensed on one of the recording layers but does not contain the irradiating region of the reflected light coming from other layers than the recording layer.

9. An optical pickup device comprising:
a laser source;
an irradiating beam condensing optical system which focuses the laser beam from the laser source on one of the recording layers for the multilayered optical information recording medium, and
a detecting optical system which detects the reflected light coming from the recording layer of the multilayered optical information recording medium,
wherein the irradiating beam condensing optical system has a beam splitter and an objective lens arranged in the optical path thereof, the irradiating beam condensing optical system and the detecting optical system jointly owning the beam splitter and the objective lens,
wherein the irradiating beam condensing optical system permits the laser beam from the laser source to pass in the form of divergent light through the beam splitter,
wherein the detecting optical system includes:
a dividing optical system which divides the reflected beam coming from the recording layer into two portions at both sides of the optical axis so that it gradually converges to the optical axis without passing along the optical axis immediately after division; and a reflecting region limited reflection plane which is arranged at the minimum spot position of the reflected light coming from one of the recording layers which is among the reflected beams that have passed through the dividing optical system;

wherein an optical detector which detects the beam reflected by the reflecting region limited reflection plane, and wherein the reflecting region limited reflection plane reflects the reflected beam coming from one of the recording layers but not to reflect the reflected beams coming from other recording layers.

10. The optical pickup device according to claim 9, wherein the dividing optical system includes two biprisms arranged along the optical axis.

11. The optical pickup device according to claim 9, wherein the dividing optical system includes two grating elements arranged along the optical axis, the two grating elements being divided at the plane containing the optical axis, the grating elements having a serrated groove shape, the groove having a depth enough to suppress the zeroth light and being symmetric with the plane containing the optical axis.

12. The optical pickup device according to claim 9, wherein the dividing optical system is arranged between an optical element which converges the reflected beam toward the reflecting region limited reflection plane and the reflecting region limited reflection plane.

* * * * *